United States Patent

Wada

[15] 3,684,209

[45] Aug. 15, 1972

[54] AUTOMATIC RETURN SYSTEM FOR TAPE RECORDER

[72] Inventor: Shoji Wada, Kyoto, Japan

[73] Assignee: Mitsubishi Electric Corporation, Tokyo, Japan

[22] Filed: Nov. 4, 1970

[21] Appl. No.: 86,757

[30] Foreign Application Priority Data

Nov. 24, 1969 Japan ........................45/94110

[52] U.S. Cl. ................................................242/188

[51] Int. Cl. ........B65h 59/38, G03b 1/04, G11b 1/52

[58] Field of Search.......................242/188, 200–204

[56] References Cited

UNITED STATES PATENTS 2,941,737 6/1960 Jones..........................242/188

3,363,853 1/1968 Irvin .........................242/188 X

*Primary Examiner*—Leonard D. Christian

*Attorney*—Oblon, Fisher & Spivak

[57] ABSTRACT

A cassette tape recorder is provided with a pair of capstans and an associated pair of pinch rollers disposed on opposite sides of a magnetic head for transferring a tape both toward the right side and toward the left side thereof.

Selection between two combinations of the capstans and the pinch rollers is effected by a crank gear adapted to be rotated by applying a rotational force from a fly wheel coaxially arranged with each of the capstans, and a bifurcated lever switch arranged to hold a crank pin eccentrically provided on the crank gear therebetween. The crank gear also has toothed portions and notch portions on its periphery, the toothed portions being adapted to engage a pinion which rotates dependently on rotation of the cap-stan. Stoppers are positioned adjacent the periphery of the crank gear for engaging a latching member of an electromagnetic clutch. When a detecting pulse current is supplied from a tape end detecting circuit device to the electromagnetic clutch, the latching member of the clutch is caused to release the stopper and a pendulum swing of the lever switch is initiated. By such swing of the lever switch, one pinch roller which has been engaged with the corresponding capstan is moved away therefrom, and at the same time the other pinch roller which has been moved away from the corresponding capstan is engaged therewith, and further a tape take-up means is reversed to provide an opposite take-up force.

5 Claims, 3 Drawing Figures

INVENTOR
SHOJI WADA

BY Oblon, Fisher and Spivak
ATTORNEYS

INVENTOR
SHOJI WADA

BY Oblon, Fisher and Spivak
ATTORNEYS

AUTOMATIC RETURN SYSTEM FOR TAPE RECORDER

BACKGROUND OF THE INVENTION

1. Field of the Invention:

This invention relates generally to cassette-type tape recorders and more particularly to a cassette tape recorder characterized by the provision of means for transferring the tape both toward the right side and toward the left side, namely, a so-called automatically reversible tape recorder.

2. Description of the Prior Art:

Many internationally standardized cassette tapes are now commercially available. Since these cassette tapes are compatible and can be easily mounted on various machines, they are very convenient and are widely used. However, the cassette-type tape is different from the ordinary open reel-type tapes in that the tape end is rigidly secured to the cassette. Therefore, when using such cassette-type tapes, even when the tape comes to end, the tape recorder will continue to silently operate. If the operator becomes aware of the situation and stops the tape recorder, no real problem occurs, but if the operator does not stop the tape recorder, the tape end will continue to be forceably pulled and ultimately will be torn near the connecting point thereof to the cassette. When this happens, the cassette tape can no longer be used, because of the closed condition of the cassette.

To eliminate such disadvantages, some quality tape recorders have recently been proposed in which a tape end detecting device is provided for detecting the end of the tape of the cassette and producing a signal to automatically stop the tape recorder by means associated therewith and responsive to the signal. This prevents tearing of the tape end from the cassette and thereby protects the cassette from being damaged.

However, another disadvantage of cassette-type tapes is that they are much shorter in length than the former large open reel-type tapes, and therefore they are not suitable for transcription of musical performances and speeches of long duration, since they are not capable of operating for a sufficient length of time before coming to the tape end. Thus, these tape recorders may automatically stop when the tape end is reached, to prevent damaging the cassette, as hereinbefore indicated, but the complete performance may not have been recorded or played, and at the same time, in the case of recording, the operator will not even be aware of the precise point at which the recording stopped.

SUMMARY OF THE INVENTION

Thus, it is an object of the present invention to provide an improved cassette-type tape recorder characterized by novel means for automatically detecting the end of the cassette tape and preventing the same from being damaged.

Another object of the present invention is to provide a cassette-type tape recorder having improved characteristics for recording in uninterrupted fashion over a long period of time.

Still another object of the present invention is to provide an improved cassette-type tape recorder which automatically reverses the transfer of the cassette tape upon reaching the tape end for permitting uninterrupted operation over a longer period of time.

Accordingly, this invention provides an automatically reversible tape recorder in which the tape of the cassette is reversely transferred by a tape-end signal from a tape end detecting device for continuously transferring the tape between the right side and the left side thereof.

The system of this invention is capable of exactly and reliably reversing the tape transferring direction by rotating a crank gear through the application of a rotational force from a fly wheel coaxially arranged with one of the capstans for rotational movement therewith to effect a simultaneous switching of the pinch roller and take-up means for the two capstans. This switching operation is achieved simply by supplying a pulse current to an electromagnetic clutch. The periphery of the crank gear is provided with toothed portions for engaging a pinion and a pair of notches between the toothed portions for disengaging purposes, and also includes a crank pin eccentrically disposed thereon which is operably connected with a lever switch actuable by tension springs associated with the right side and left side pinch rollers for rotating the crank gear exactly through an arc of 180°.

Switching of the direction of rotation of the motor used is thereby not required and the switching operation thus requires less energy. Furthermore, the crank gear is normally latched by an electromagnetic clutch for maintaining the same in a condition in which it is about to be rotated clockwise by the biased lever switch, and thus an erroneous switching operation cannot be caused by the vibration of the machine or by the application of an impact force.

According to this invention, a very simple and small mechanism may be satisfactory for the purpose. Generally, the standard dimensions of the cassette require a small mechanism for the cassette tape recorder. However, it has heretofore been impossible to make a sufficiently small mechanism for automatically reversing the transfer of the tape. Therefore, it has been heretofore impossible to automatically reverse the direction of transfer of a cassette tape. The small mechanism provided by the present invention, as indicated hereinbefore, makes it possible to automatically reverse the direction of transfer of cassette tape, whereby cassettes can be used for automobile tape players which must have the ability of automatic and continuous play and must be small-sized.

BRIEF DESCRIPTION OF THE DRAWINGS

Various other features and attendant advantages of the present invention will be more readily appreciated as the same becomes better understood from the following detailed description when considered in connection with the accompanying drawings, wherein like reference numerals indicate like or corresponding parts throughout the several views, and in which.

DESCRIPTION OF A PREFERRED EMBODIMENT

Figure 1:
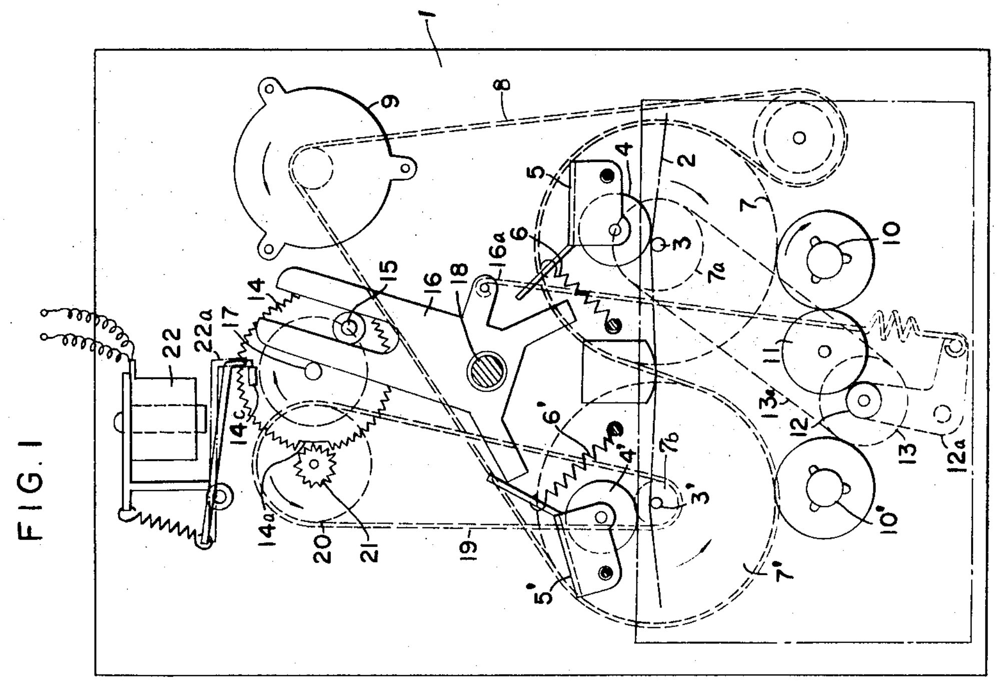
FIG. 1 is a schematic plan view showing the main part of a tape recorder formed according to this invention with the tape being transferred toward the right side.

Referring now to the drawings, and more particularly to FIG. 1 thereof, reference number 1 indicates a cassette having a tape 2 movably positioned about a right-side capstan 3 and a left-side capstan 3'. A right-side pinch roller 4 and a left-side pinch roller 4' are respectively connected to a right-side pinch roller lever 5 and a left-side pinch roller 5', which in turn are pivotally biased about a pivot by tension springs 6 and 6', respectively, for normally pressing the right-side pinch roller 4 against the right-side capstan 3 and the left-side pinch roller 4' against the left-side capstan 3'.

The capstan 3 is connected to a fly-wheel 7 for rotation therewith about a common axis. A rotational force is imparted to the fly-wheel 7 through a drive belt 8 driven by a motor 9 to cause the capstan 3 to operate in a clockwise direction. In similar manner, the left-side capstan 3' is caused to rotate in a counter-clockwise direction through its connection with a fly-wheel 7' and the drive belt 8 which also is entrained thereabout. Right-side and left-side take-up means 10 and 10' are provided for taking up the tape 2 being transferred by the capstans 3 and 3' to prevent the tape from being slackened.

For this purpose, a rotational force is imparted to the right-side take-up means 10 through a pulley 7*a* integrally formed with, or otherwise securably fastened to the right-side fly-wheel 7 for rotation therewith, a take-up belt 13*a* entrained about the pulley 7a and a take-up pulley 13, a small friction wheel 12 mounted on the pulley 13 and rotatable therewith and an intermediate friction wheel 11 engaging the friction wheel 12 and the take-up means 10.

A crank gear 14 has a pair of notches 14*a* and 14*b* provided on its periphery and spaced 180° in angular relation from each other. The crank gear 14 is provided with an eccentric crank pin 15 which is fitted into a pinch roller lever switch 16 for causing the lever switch 16 to swing about a fixed pin 18 on which it is supported as the crank gear 14 rotates about its central axis 17. A belt 19 is entrained about a pulley 7b integrally formed with, or otherwise securably fastened to, the left-side fly-wheel 7' for rotation therewith, and about a spaced switching power pulley 20 having a switching pinion member 21 secured thereon, for imparting a rotational force to the pinion 21. The crank gear 14 is also provided about its periphery with a pair of diametrically opposed stoppers 14c and 14d. A latching member 22*a* of an electromagnetic clutch 22 can engage with the stopper 14*c* to latch the crank gear 14 in the position shown in FIG. 1, wherein the pinion 21 faces the notch 14*a* or, alternatively, with stopper 14*d* to latch the crank gear in the position wherein pinion 21 faces the notch 14*b* of the crank gear and thus, in either case, is not in engagement with the crank gear.

In the above-mentioned arrangement, as shown in FIG. 1, the lever switch 16 biases the left-side pinch roller lever 5' against the left-side tension spring 6' to move the left-side pinch roller 4' away from the left-side capstan 3'. The right-side pinch roller 4 is pressed against the capstan 3 to transfer the tap 2 toward the right-side. In the position shown in FIG. 1, a rotational force which can make the lever switch 16 swing in a counter-clockwise direction is exerted on the lever switch 16 through the left-side pinch roller lever 5' by the left-side tension spring 6'. This means that a rotational force which can make the crank gear 14 rotate in a clockwise direction is exerted on the crank gear 14 through the crank pin 15 by the left-side tension spring 6'. Of course, it is to observed, that these rotational movements may be prevented, as shown in FIG. 1, by the engagement of latching member 22*a* with the stopper 14*c*.

Figure 2:
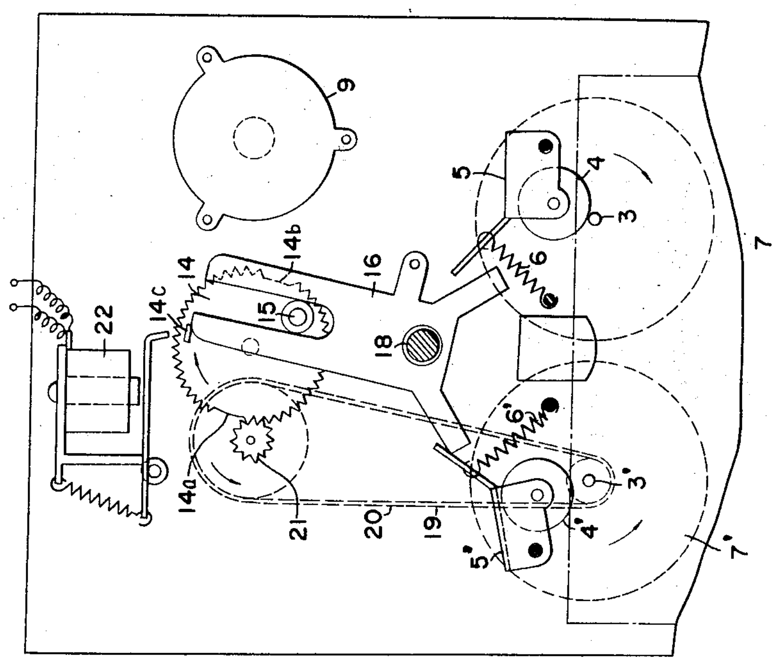
FIG. 2 is a schematic plan view similar to FIG. 1, but showing the tape recorder in a condition under which the tape recorder is about to be switched from the condition of FIG. 1 to the automatically reversing operation.

FIG. 2 shows the initial condition of the automatic return operation with this arrangement. The automatic return operation can be initiated when a detecting pulse current from a suitable means, such as, for example, a tape end detecting circuit device, is applied to the electromagnetic clutch 22 after the condition, as shown in FIG. 1, continues for a predetermined period. Specifically, when the electromagnetic clutch 22 is momentarily energized, the latching member 22*a* is caused to release the stopper 14*c*. Thus, clockwise rotation of the crank gear 14 immediately is initiated by the left-side tension spring 6'. This permits the switching pinion 21 to engage with the crank gear 14. Thus the crank gear 14 continues to be rotated through 180° until the pinion 21 faces the other notch 14*b* of the gear 14, whereupon the other stopper 14*d* is engaged by the latching member 22*a* of the electromagnetic clutch 22, thereby latching the crank gear 14. In this condition, as shown in FIG. 3, the pinion 21 is just in front of the notch 14*b* and the pinion 21 is therefore not in engagement with the crank gear 14.

Figure 3:
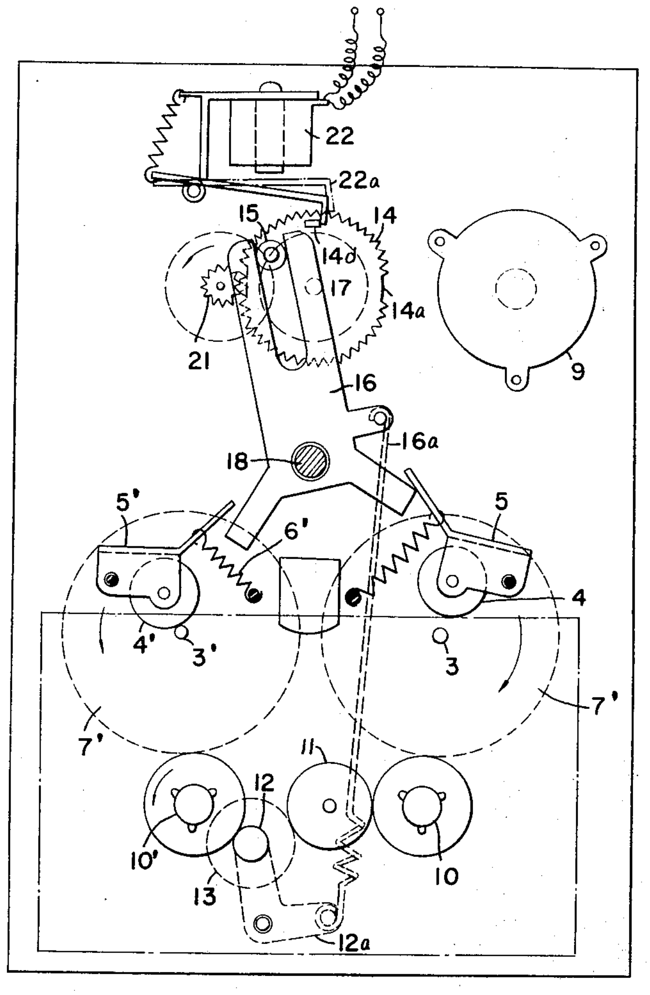
FIG. 3 is a schematic plan view similar to FIG. 1, but showing the tape recorder with the tape being transferred toward the left side after completion of the reversing operation.

Referring now more particularly to FIG. 3, it may be observed that the counter-clockwise movement of the lever switch 16 causes the pinch roller lever 5 to be biased against the tension of spring 6 to thereby move the right-side pinch roller 4 away from the right-side capstan 3, and simultaneously permits the left-side pinch roller 4' to be pressed against the left-side capstan 3' under the urging of spring 6' to effect transfer of the tape 2 toward the left-side. When the electromagnetic clutch 22 is momentarily energized again, the latching member 22*a* of the clutch is removed from the stopper 14*d* and the crank gear 14 is rotated through 180°, returning it from the position of FIG. 3 back to that of FIG. 1.

In the condition shown in FIG. 3, a rotational take-up force is imparted through the take-up pulley 13 and the small friction wheel 12 to the left-side take-up means 10' for the purpose of taking up the tape 2 which is being transferred by the left-side pinch roller 4' and the left-side capstan 3'. This is due to the fact that a take-up force switching lever 12*a* is swung by the lever switch 16 and a linking bar 16*a* to cause the small friction wheel 12 to be pressed against the left-side take-up means 10'. Obviously, in the opposite sense, when the lever switch 16 is rotated in a clockwise direction, back to the position shown in FIG. 1, the take-up force switching lever 12*a* is pivoted by the linking bar 16a to cause the friction wheel 12 to be pressed instead against the intermediate friction wheel 11 for driving the right-side take-up means 10.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An automatically reversible tape recorder comprising:
a pair of spaced capstans;
a pair of pinch rollers respectively disposed adjacent said capstans and being movable into and out of engagement therewith;
a pinion operatively connected to one of said capstans for rotation therewith;
a crank gear having at least a pair of toothed portions and at least a pair of notch portions spaced therebetween on its peripheral surface, said toothed portions being engageable with said pinion for causing said crank gear to be rotated thereby and said notch portions being adapted to interrupt said engagement with said pinion;
a crank pin eccentrically provided on said crank gear;
an electromagnetic device responsive to a detecting signal from a tape end detecting device for controlling the rotation of said crank gear; and a lever switch operatively connected to said crank pin of said crank gear for alternately pressing said pinch rollers against the respective capstans, whereby the transfer of the tape can be reversed by alternately pressing the pinch rollers against the capstans in response to said detecting signal.

2. An automatically reversible tape recorder as set forth in claim 1, wherein said crank gear is provided on its periphery with two notches, said notches being spaced 180° apart.

3. An automatically reversible tape recorder as set forth in claim 2 wherein said electromagnetic device comprises a latching member; and
said crank gear is provided with stoppers adjacent its peripheral edge, said stoppers being spaced substantially 90° from said notches and being engageable by the latching member of said electromagnetic device.

4. An automatically reversible tape recorder as set forth in claim 1, further comprising a take-up device for taking up the tape being transferred by cooperation of the respective pinch rollers and capstans; and
means interlocked with said lever switch for changing the direction of the take-up force of said tape take-up means.

5. A tape recorder in which the direction of transfer of the tape can be automatically reversed when the tape end is reached, comprising:
an electric motor;
a pair of side-by-side fly wheels rotatable in opposite directions by said motor;
a capstan coaxially mounted on each of said fly wheels for rotation therewith;
a pair of pinch rollers adapted to be respectively engaged with said capstans;
means for urging each of said pinch rollers into pressing engagement with said respective capstans;
a lever switch for alternately interrupting the engagement of one and the other of said pinch rollers with the respective capstans thereof;
a tape end detecting device;
a pinion operatively connected to one of said capstans for rotation therewith;
an electromagnetic device and a gear device for controlling the switching operation of said lever switch in response to a tape end detecting signal from said tape end detecting device, said gear device having stoppers arranged adjacent the periphery of the gear to be engaged by a latching member of said electromagnetic device and a crank pin being eccentrically provided on the gear to be receivably engaged by the lever switch, and being adapted to be periodically rotated by said pinion;
a take-up device for taking up the tape transferred by cooperation of each of the pinch rollers with the respective capstans thereof; and
means interlocked with said lever switch for changing the direction of the take-up force of said take-up device.

* * * * *